United States Patent

Mohamed et al.

Patent Number: 5,518,320
Date of Patent: May 21, 1996

[54] FOIL BEARING

[75] Inventors: Zahroof Mohamed; Luis A. San Andres, both of College Station, Tex.

[73] Assignee: The Texas A&M University System, College Station, Tex.

[21] Appl. No.: 292,402

[22] Filed: Aug. 18, 1994

[51] Int. Cl.⁶ .................................................. F16C 32/06
[52] U.S. Cl. .......................................................... 384/103
[58] Field of Search ................................... 384/103, 104, 384/105, 106

[56] References Cited

U.S. PATENT DOCUMENTS

| | | | |
|---|---|---|---|
| 3,434,761 | 3/1969 | Morley | 384/103 |
| 3,506,314 | 4/1970 | Gross et al. | 384/104 |
| 3,520,578 | 7/1970 | Licht | 384/104 |
| 3,635,534 | 1/1972 | Barnett . | |
| 3,747,997 | 7/1973 | Winn . | |
| 3,795,427 | 3/1974 | Licht et al. . | |
| 3,809,443 | 5/1974 | Cherubim . | |
| 4,445,792 | 5/1984 | Trippett | 384/103 |
| 4,815,864 | 3/1989 | Jones | 384/103 |

FOREIGN PATENT DOCUMENTS

| 190118 | 11/1982 | Japan | 384/103 |
|---|---|---|---|

OTHER PUBLICATIONS

M. Saville, A. Gu and R. Capaldi; "Liquid Hydrogen Turbopump Foil Foil Bearing;" Jun. 24–26, 1991.
G. L. Agrawal; SAE Technical Paper Series, "Foil Gas Bearings for Turbomachinery;" Jul. 9–12, 1990.
H. Heshmat, J. A. Walowit and O. Pinkus; Journal of Lubrication Technology, "Analysis of Gas–Lubricated Foil Journal Bearings;" Oct. 1983; vol. 105.
H. Heshmat, W. Shapiro and S. Gray; Journal of Lubrication Technology, "Development of Foil Journal Bearings for High Load Capacity and High Speed Whirl Stability;" Apr. 1982; vol. 104.
L. Licht and M. Branger; Transactions of the ASME, "Motion of a Small High–Speed Rotor in 3 Types of Foil Bearings;" Apr. 1975.

*Primary Examiner*—Thomas R. Hannon
*Attorney, Agent, or Firm*—Vaden, Eickenroht, Thompson & Feather

[57] ABSTRACT

A foil journal bearing comprising a housing having an opening to receive the journal of a shaft, and a plurality of foil supports extending longitudinally through the opening. The foil supports having arcuate inner and outer surfaces and are positioned to transversely surround the journal. An endless foil element encircles each foil support in a direction transverse the longitudinal axis of the element to engage and support the journal. Rods are positioned between the outer arcuate surface of each foil support and respective foil element that are movable relative to the foil support for varying the stiffness of each foil element.

7 Claims, 7 Drawing Sheets

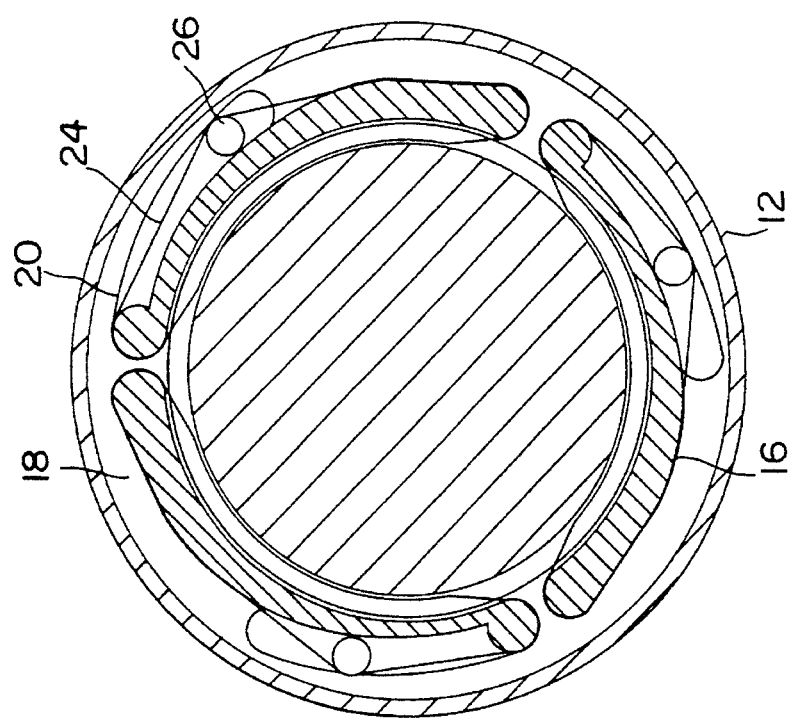
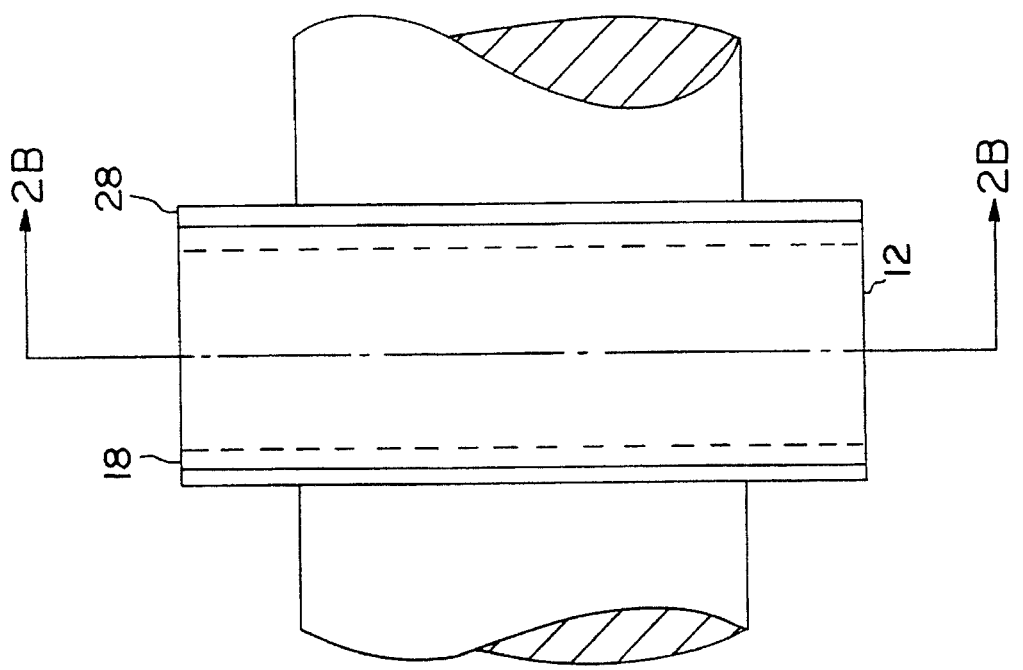

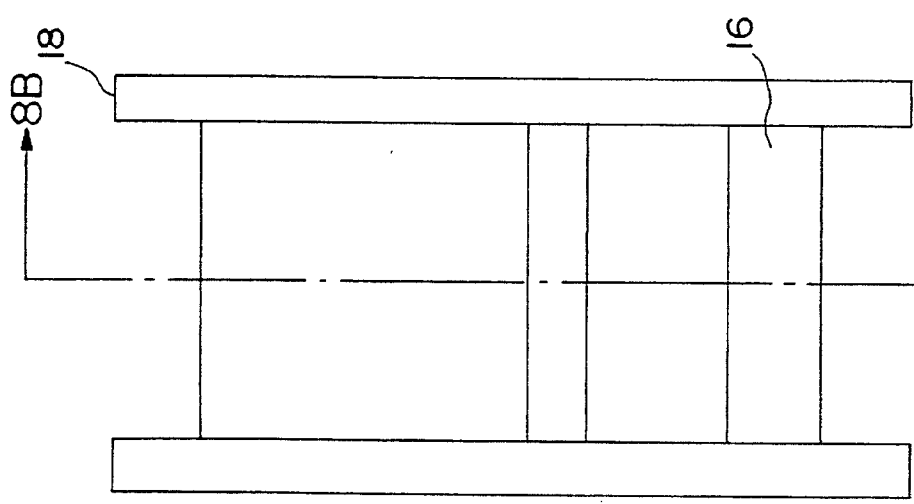
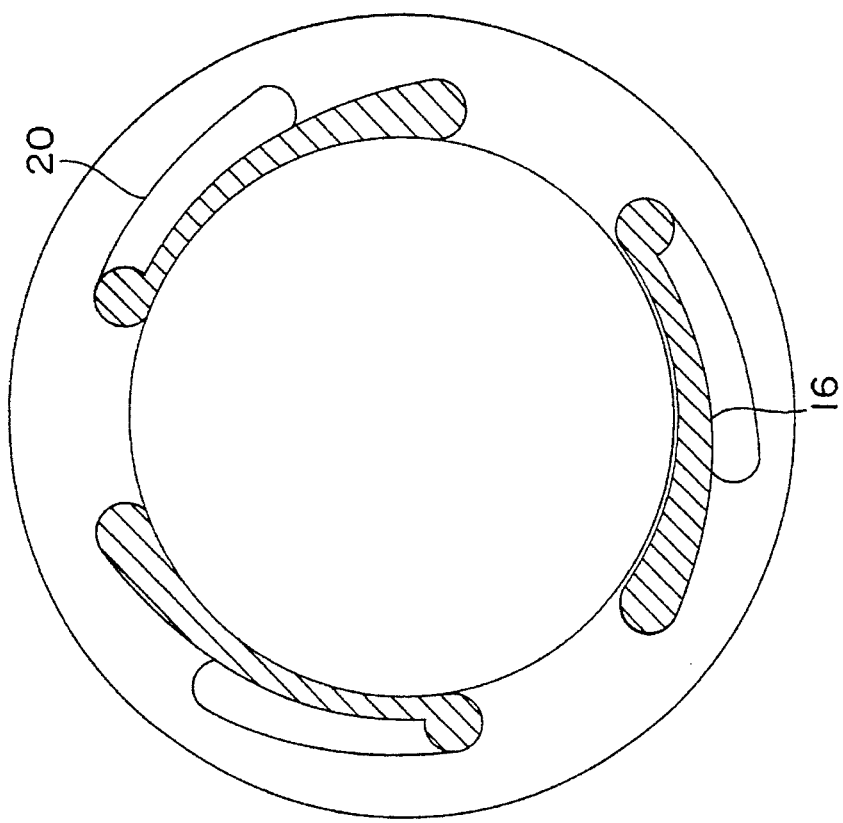
FIG. 8A
FIG. 8B

FOIL BEARING

BACKGROUND OF THE INVENTION

This invention relates to foil bearings generally and in particular a variable stiffness mechanism for use with foil bearings.

Foil bearings are used to support light weight, high speed rotors in compressors, turbochargers, turbogenerators, turbine gas generators, cryogenic expanders, blowers, pumps, aircraft aircycle machines, centrifuges, scanners, computer tape drives, yarn spinners and the like.

The advantages of foil bearings are many and include:

(a) stability at high operating speeds without the harm of destruction at the onset of self excited whirl and the capacity to traverse two or more critical speeds with ease;

(b) capability of operating at extreme temperatures (high temperatures for gases and low temperature for cryogenic liquids) and in the presence of thermal gradients;

(c) ability to accommodate misalignment, manufacturing inaccuracies and differential expansion of bearing components;

(d) possession of inherent damping, flexibility and good wipe-wear characteristics; and (e) tolerance of contaminants and abrasive particles.

DESCRIPTION OF THE RELATED ART

There are a variety of foil bearings available, some of which are shown in U.S. Pat. Nos. 3,635,534; 3,747,997; 3,795,427 and 3,809,443 and in the technical publications: L. Licht and M. Branger, "Motion of a Small High-Speed Rotor in 3 Types of Foil Bearings," Journal of Lubrication Technology, Trans. ASME Vol. 97, Ser. F, No. 2, April 1975, pp. 1–11; H. Heshmat, W. Shapiro and S. Gray, "Development of Foil Journal Bearings for High Load Capacity and High Speed Whirl Stability," Journal of Lubrication Technology, April 1982, Vol. 104, pp. 149–156; H. Heshmat, J. A. Walowit, O. Pinkus, "Analysis of Gas-Lubricated Foil Journal Bearings," Journal of Lubrication Technology, October 1983, Vol. 105, pp. 647–655; G. L. Agarwal entitled "Foil Gas Bearings for Turbomachinery," 20th Intersociety conference on Environmental Systems, SAE Technical Paper Series, 901236, July 9–12, 1990; and M. Saville and A. Gu, "Liquid Hydrogen Turbopump Foil Bearing", AIAA/SAE/ASME/ASEE 27th Joint Propulsion Conference, June 24–26, 1991.

None of the foil bearings described in these patents and papers provide means for varying the structural stiffness of the bearing, either actively or passively. The bearing of this invention incorporates one of at least three different mechanisms to achieve this purpose.

The foil geometry in the present bearing is similar to that of the tension dominated foil bearings of the cylindrical type, whose performance characteristics are presented in the publication of L. Licht mentioned earlier. The present bearing, however, is more compact and flexible in design than conventional cylindrical tension bearings.

The hydresil bearing and the multi-leaf bearing, described in the publications of H. Heshmat and A. Gu, respectively, are also compact. The hydresil bearing, however, has bumps which are prone to buckling and sharp creases prone to crack propagation. Both the hydresil bearing and the multi-leaf bearing have spot welds that are exposed to shock loading. It is usually the failure of these spot-welds that lead to the catastrophic failure of these bearings. Furthermore, these designs cannot be disassembled or repaired if the need arises.

It is therefore an object of the present invention to provide a foil bearing assembly having means to actively or passively vary the stiffness of the foil bearing.

It is a further object to provide a foil bearing assembly that is more reliable than those foil bearings presently available, and that is designed to eliminate buckling, folding, and the propagation of cracks.

It is a further object to provide a foil bearing assembly that is compact and flexible in design.

It is a still further object to provide a foil bearing assembly that facilitates commercial manufacture and assembly, as well as disassembly for maintenance or inspection.

It is yet a further object to provide a continuous foil bearing element that is free of spot welds and that has a joint that can be tested before the element is installed in a bearing assembly.

SUMMARY OF THE INVENTION

A foil journal bearing is provided comprising a housing having an opening to receive the journal of a shaft. A plurality of foil supports extend longitudinally through the opening, the foil supports being arcuate in transverse cross section. Foil support mounting plates are positioned on opposite sides of the bearing to support the foil supports such that the foil supports surround the journal. An endless foil element encircles each foil support in a direction transverse the longitudinal axis of the element to provide a section that extends between the edges of each foil support in spaced relationship to the foil supports to engage and support the journal. Means are positioned between the outer arcuate surface of each foil support and respective foil element that are movable relative to the foil support for varying the stiffness of each foil element.

In a particular embodiment of the foil journal bearing, each foil support mounting plate has an opening adjacent the outer arcuate surface of one of the foil supports for supporting the stiffness varying means and an opening to receive the journal.

In a further embodiment of the foil journal bearing, the thickness of the foil supports increase in one transverse direction, and the stiffness varying means for each foil support comprises a rod supported by the mounting plates and movable along the outer surface of each foil support.

In another embodiment of the foil journal bearing, first and second rod end plates are further provided. Each of the end plates has a plurality of radially extending openings within which the ends of said rods are positioned. The rod end plates are rotatable relative to the foil support mounting plates to move the rods over the respective contoured outer surfaces of the foil supports by way of the openings through the foil support mounting plates to vary the stiffness of the foil elements.

In a still further embodiment of the foil journal bearing, each of the rods extend beyond the foil support mounting plates and gear teeth are mounted on the rods adjacent the ends of the rods. First and second end ring gears are further provided, having gear teeth about the inner surfaces thereof that engage the respective gear teeth adjacent the ends of each rod for rotation of the rods relative to the respective foil supports upon rotation of the end ring gears.

In a further embodiment, the foil journal bearing again comprises a housing having an opening to receive the journal of a shaft, and a plurality of foil supports extending longitudinally through the opening. The foil supports have arcuate inner surfaces, first and second ends, and are positioned to transversely surround the journal. However, a plurality of foil elements have first and second ends. The first end of each of the foil elements respectively engages one of the foil supports and the second end of each of the foil elements respectively engages the housing such that said foil elements are placed in tension across the arcuate inner surfaces of the respective foil supports to engage and support the journal. First and second foil support mounting plates are respectively connected to the first and second ends of the foil supports. The foil support mounting plates are rotatable with respect to the housing for varying the stiffness of the foil elements.

In yet another embodiment of the foil journal bearing provided, the housing comprises a cylindrical casing.

BRIEF DESCRIPTION OF THE DRAWINGS

In the drawings,

FIGS. 2A and 2B are side and sectional views, respectively, of a hydrodynamic contoured surface foil support bearing mechanism supporting the journal of a shaft;

FIGS. 8A and 8B are side and sectional views, respectively, of the foil support elements and mounting plates of the hydrostatic contoured surface foil support bearing mechanism.

DETAILED DESCRIPTION OF THE PREFERRED EMBODIMENT

As explained above it is the object of this invention to provide a foil bearing that allows the structural stiffness of the foil bearing to be varied. The stiffness in the bearing can be either fine tuned to a particular value before installation/operation or it can be changed actively during operation, as will be explained further below.

Figure 4:
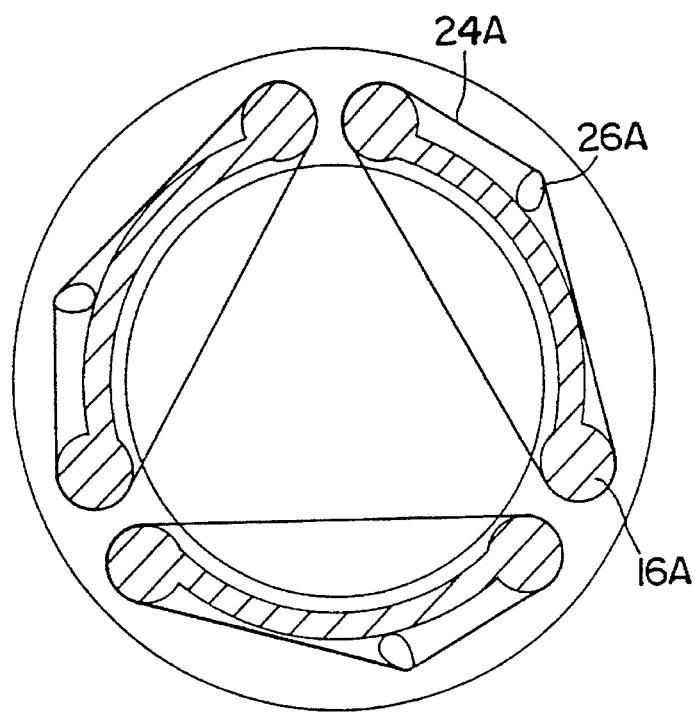
FIG. 4 is a sectional view of a hydrodynamic cam-operated foil support bearing mechanism according to the present invention.
Figure 5:
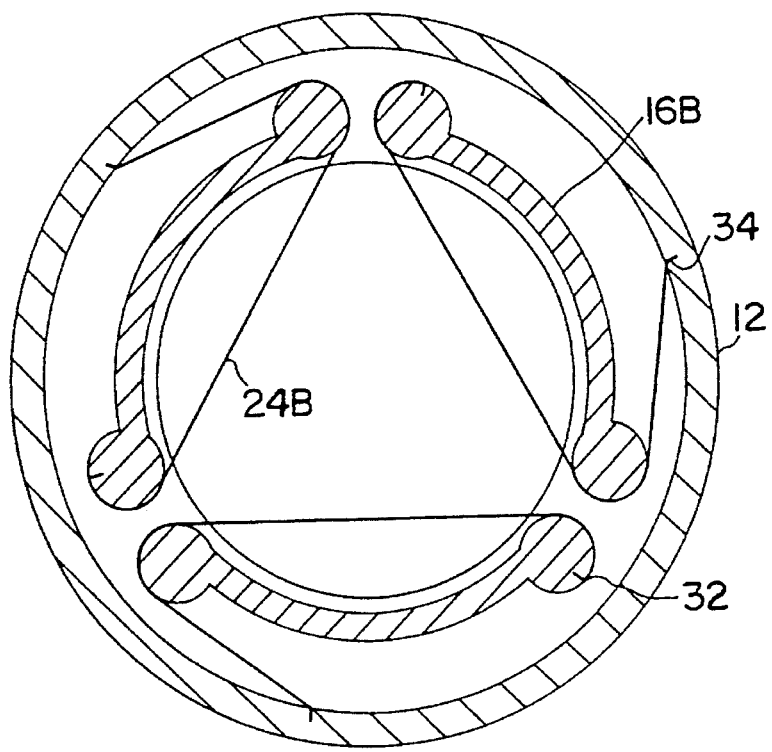
FIG. 5 is a sectional view of a hydrodynamic fixed foil element bearing mechanism according to the present invention.

The bearing assembly of the present invention introduces a choice of several different mechanisms to vary the stiffness of the bearing. Three particular mechanisms, displayed respectively in FIGS. 1, 4, and 5, are:

i) the contoured foil support surface;

ii) the cam operated; and iii) the fixed foil element mechanisms.

Figure 1:
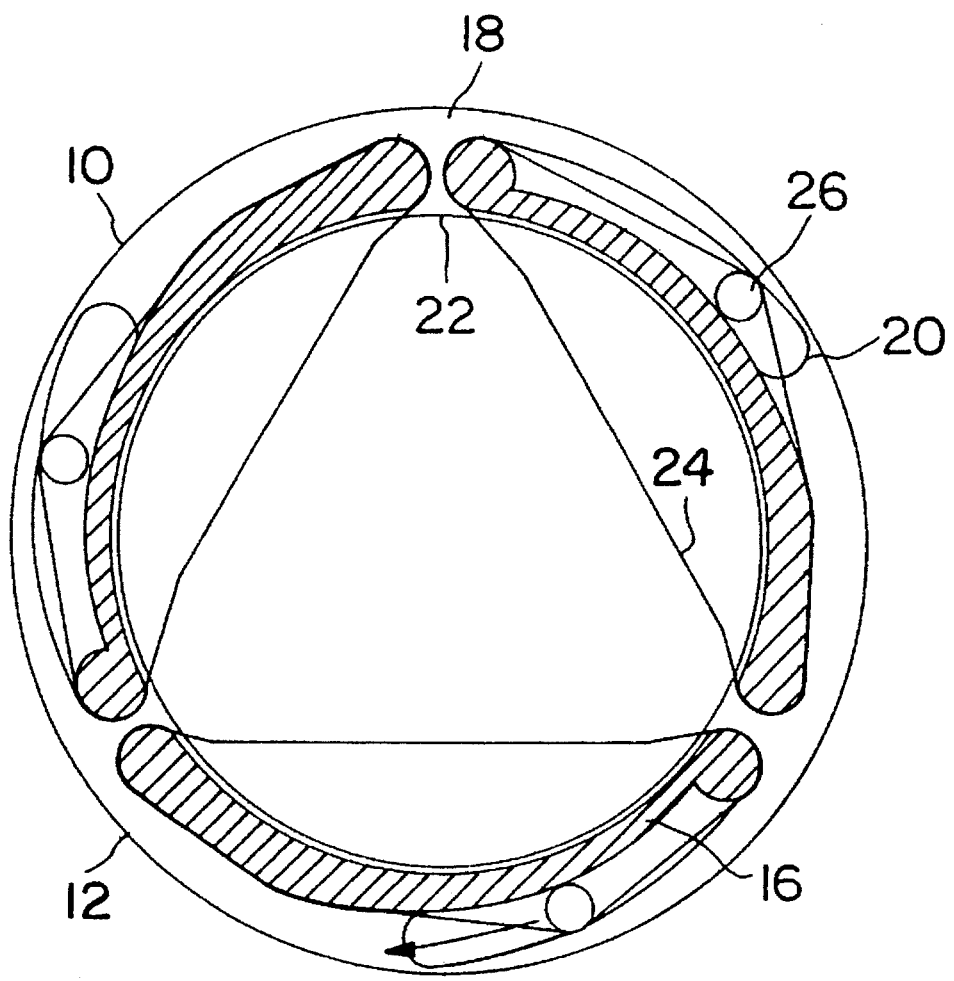
FIG. 1 is a sectional view of a hydrodynamic contoured surface foil support bearing mechanism according to the present invention.

FIG. 1 shows the hydrodynamic contoured surface foil support mechanism, labeled generally 10. The mechanism comprises housing 12 having an opening to receive the journal of a shaft and a plurality of foil supports 16 extending longitudinally through the opening.

FIGS. 2A and 2B are side and cross-sectional diagrams, respectively, of one of the possible configurations for a hydrodynamic bearing incorporating the contoured surface foil support mechanism. The bearing is shown in the diagram with the journal in position.

The critical component in this mechanism is foil support 16. A plurality of foil supports 16 are positioned to transversely surround the journal. Each of supports 16 has first and second ends, and arcuate inner and outer surfaces. The outer surface of these supports are contoured such that the thickness of the support for each foil varies from one end to the other.

Continuous resilient foil 24 encircles (i.e., is slipped over) each foil support 16 in a direction transverse the longitudinal axis of the element to engage and support the journal. Foil element 24 is prevented from slipping by means of a stop or a key-way on the foil support outer surface (not shown in the figure). This foil design eliminates the need for spot welding of the foil on the inner surface of the bearing. The ends of the foil can be welded by a more reliable method than spot-welding and tested prior to installation. This innovative concept neither has bumps that are prone to buckling, nor sharp creases which are susceptible to the formation and propagation of cracks.

The bearing mechanism further comprises first and second foil support mounting plates 18 to which the first and second ends of each foil support 16 are respectively connected. It can be seen in FIG. 2A that mounting plates 18 also incorporate the outer housing 12 of the bearing. The foil support mounting plates 18 have respective openings 20 adjacent the outer arcuate surface of each foil support for passage of a stiffness varying means (described below), and opening 22 to receive the journal. Openings 20 adjacent the foil supports are arcuate and parallel with the outer arcuate surface of each respective foil support.

Means are positioned between the outer arcuate surface of each foil support 16 and respective foil element 24 that are movable relative to the foil support 16 for varying the stiffness of each foil element 24. Each of the stiffness varying means comprises rod 26 extending longitudinally through both of said foil support mounting plates 18. Each of the rods has a first and second end.

Figure 3B:
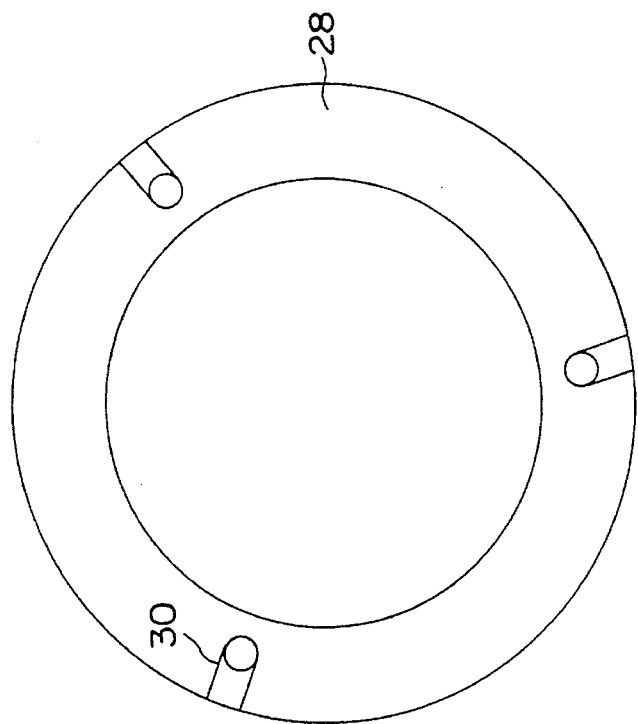
FIGS. 3A and 3B are side and sectional views, respectively, of rods and rod end plates of the hydrodynamic contoured foil support bearing mechanisms.
Figure 3A:
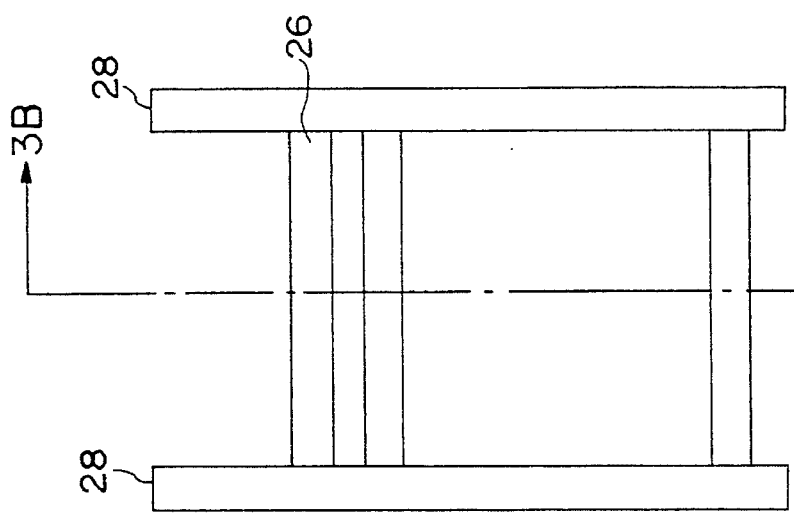

The rod ends are respectively connected to first and second rod end plates 28 (one of the rod end plates being detachable) and pass through openings 20 which serve as guide-ways provided on foil support mounting plates 18. Rods 26 rest on the foil support contoured outer surface and lie between it and foil elements 24. Rod end plates 28 have a plurality of radially extending openings 30, as seen in FIGS. 3A and 3B, within which the first and second ends of the rods are respectively carried.

Rod end plates 28 are rotatable relative to foil support end plates 18 to move rods 26 over the respective contoured outer surfaces of foil supports 16 by way of guide-way openings 20 through foil support mounting plates 18 to vary the tension and stiffness of foil elements 24. The rate of increase in the thickness of the contoured surface will determine the rate at which the tension in the foil increases.

FIG. 4 illustrates the hydrodynamic cam-operated mechanism of the prevent invention. This mechanism is similar to the one described above but it differs in that (1) the foil outer surface need not be contoured, and (2) cams vary the stiffness of the foils in this case. Rods 26A with the requisite cam cross-section are passed through openings in the foil support mounting plates and between foil 24A and the outer surface of foil supports 16A.

Rods 26A comprise first and second ends having gear teeth (not shown) machined about the respective outer surfaces thereof. The rod ends protrude out of the foil support mounting plates. The stiffness of foil elements 24A is varied by, e.g., applying torque to the gear teeth to rotate rods 26A.

First and second end rings (not shown) are provided with gear teeth machined about the inner surfaces thereof which respectively mesh with the teeth on the first and second ends of the cam-shaped rods. It is thus possible to vary the stiffness of all foil segments 24A simultaneously and equally. In this system, however, it is also possible to have separate drives for each cam to separately vary the stiffness of each foil.

In both of the above mechanisms, different methods can be employed to actively rotate the respective end plates or end rings, such as using servo-motors or step-motors for instance. For passive control, the end plates are rotated to give the required stiffness to the foils and they are then locked in place before operation.

The hydrodynamic fixed foil element mechanism, illustrated in FIG. 5, is also similar to those described above, except that one end 32 of the foil element is welded to foil support 16B as shown in the figure and the other end 34 is welded to casing 12. As such, foil elements 24B are placed in tension across the arcuate inner surfaces of respective foil supports 16B to engage and support the journal.

First and second foil support mounting plates 18 are respectively connected to the first and second ends of foil supports 16B in similar fashion to the embodiments illustrated above. Mounting plates 18 are rotatable with respect to the housing of the bearing mechanism. In the preferred embodiment, the housing comprises cylindrical casing 12. Stiffness is varied by rotating either foil support mounting plates 18 or central casing 12 while keeping the other stationary.

This is the simplest embodiment of the foil support bearing mechanisms and does away with contoured surfaces, cams, rods and other moving components. However, in this case, the foils have to be welded to their respective supports at the ends. In this respect, some of the advantages of the other two mechanisms are lost.

Figure 6:
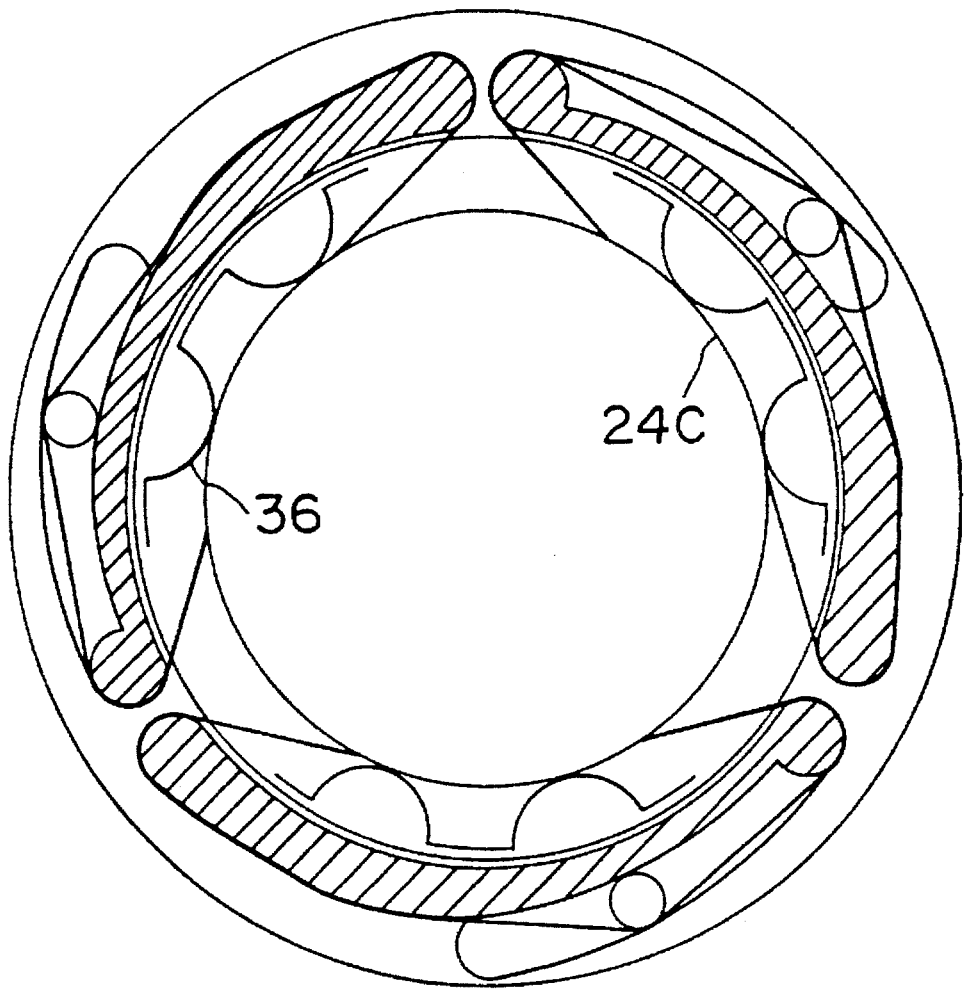
FIG. 6 is a sectional view of a hydrodynamic contoured surface foil support bearing mechanism in cooperation with corrugated foil elements.

FIG. 6 shows how corrugated foils can be used as a back-up or precautionary device, or to provide increased stiffness in the bearing. As the stiffness of top foil 24C and that of bumps 36 are in series, corrugated foils can be used in conjunction with the foil elements in tension to provide it with the desired characteristics.

Figure 7B:
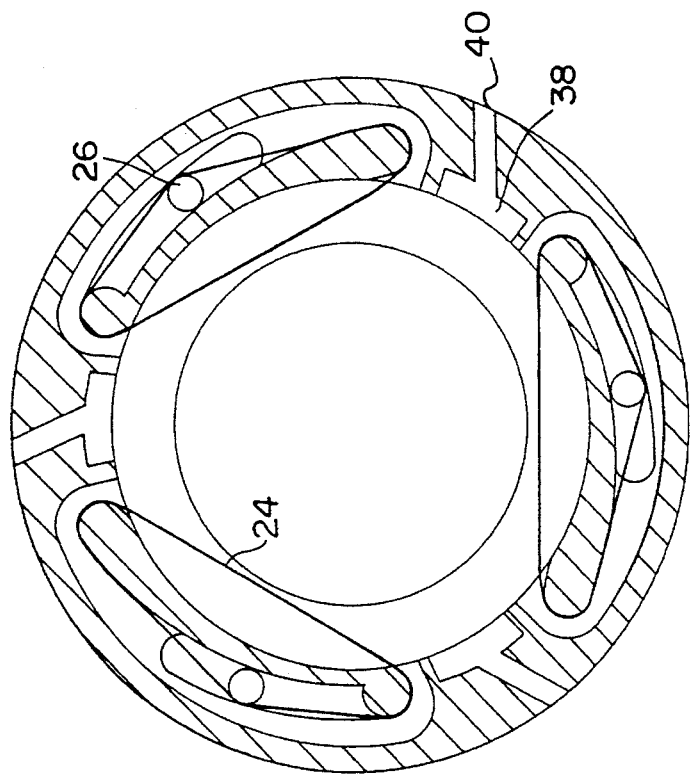
FIGS. 7A and 7B are side and sectional views, respectively, of a hydrostatic contoured surface foil support bearing mechanism supporting the journal of a shaft.
Figure 7A:
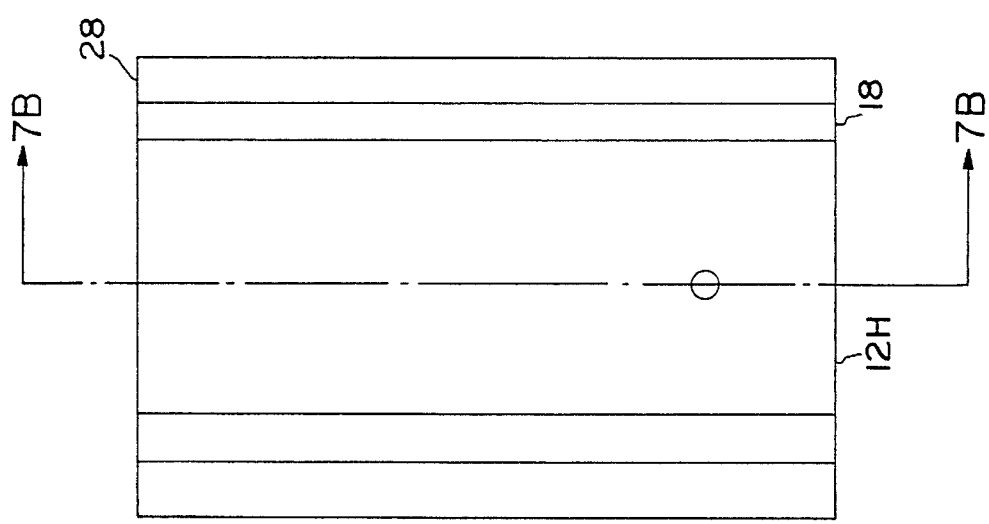

FIGS. 7A and 7B depict a typical hydrostatic bearing incorporating the contoured foil support surface mechanism. As will be understood, this design is similar to the hydrodynamic design described earlier, except that it has one more component, hydrostatic casing 12H. The hydrostatic casing acts as the housing of the bearing and it also incorporates recesses 38 for developing hydrostatic pressure and inlets 40 for the pressurized fluid.

In operation, hydrostatic pockets are formed in the vicinity of recesses 38. As the journal approaches one of the pockets, the flow is restricted in this region and the recess pressure rises. Meanwhile, the flow rate increases in the regions of the other pockets and the pressure in the corresponding recesses decreases. This pressure differential across the pockets results in a positive stiffness sufficient to support the journal without the need for journal rotation.

FIGS. 8A and 8B illustrate the foil supports and corresponding mounting plates for the hydrostatic bearing. The components are similar to those of the hydrodynamic bearing except that the rotors are spaced at a greater distance to make way for the hydrostatic casing and in this case the mounting plates do not incorporate the housing of the bearing.

The geometry of the foils is the same in all three of the foil support mechanisms and very few changes have to be made to the former two designs presented here to incorporate other variable stiffness mechanisms instead of the one shown.

It is possible to practice these inventions in ways other than those described. For example, as many foil elements as needed may be incorporated (certainly more than the three elements shown in the figures). Maintaining the same geometry of the foils as described in the fixed foil element mechanism, the stiffness of the foils may be varied by a spool mechanism. Split bearings can also be easily designed incorporating the variable stiffness mechanism, with minor alterations to the bearing designs presented here. The separate foil support component and the hydrostatic casing of the hydrostatic bearing can be combined into a single component.

The optimum configuration and integration of the bearing will depend on its application. The bearing can be used anywhere that current foil bearings find application. The hydrodynamic bearings, described above, are used primarily in high speed and low load applications. The hydrostatic bearing are used, primarily, in high load applications.

From the foregoing it will be seen that this invention is well adapted to attain all the ends and objects herein set forth, together with other advantages which are obvious and inherent thereto.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as being illustrative and not in a limiting sense.

What is claimed is:

1. A foil journal bearing comprising:

a housing having an opening to receive the journal of a shaft;

a plurality of foil supports extending longitudinally through the opening, said foil supports being arcuate in transverse cross section, foil support mounting plates positioned on opposite sides of the bearing to support the foil supports to surround a journal;

an endless foil element encircling each foil support in a direction transverse the longitudinal axis of the element to provide a section that extends between the edges of each foil support in spaced relationship to the foil supports to engage and support the journal; and means positioned between the outer arcuate surface of each foil support and respective foil element that are movable relative to the foil support for varying the stiffness of each foil element.

2. The foil journal bearing of claim 1 wherein each foil support mounting plate has an opening adjacent the outer arcuate surface of one of the foil supports for supporting the stiffness varying means and an opening to receive the journal.

3. The foil journal bearing of claim 2 wherein the thickness of the foil supports increase in one transverse direction and the stiffness varying means for each foil support comprises a rod supported by the mounting plates and movable along the outer surface of each foil support.

4. The foil journal bearing of claim 3 further comprising first and second rod end plates each having a plurality of radially extending openings within which the ends of said rods are positioned, the rod end plates being rotatable relative to the foil support mounting plates to move the rods over the respective contoured outer surfaces of the foil supports by way of the openings through the foil support mounting plates to vary the stiffness of the foil elements.

5. The foil journal bearing of claim 4 wherein each of the rods extend beyond the foil support mounting plates, gear teeth mounted on the rods adjacent the ends, said foil journal bearing further comprising first and second end ring gears having gear teeth about the inner surfaces thereof that engage the respective gear teeth adjacent the ends of each rod for rotation of the rods relative to the respective foil supports upon rotation of the end ring gears.

6. A foil journal bearing comprising:

a housing having an opening to receive the journal of a shaft;

a plurality of foil supports extending longitudinally through the opening, said foil supports being arcuate in transverse cross section with concave inner surfaces and convex outer surfaces and positioned to transversely surround the journal;

a plurality of foil elements each having one end attached to a side of each respective foil support and extending across the concave inner surface around the opposite side thereof, the other end of each foil element being anchored to said housing such that said foil elements are placed in tension across the concave inner surfaces of said respective foil supports to engage and support the journal; and a pair of foil support mounting plates each being connected to one end of said foil supports, whereby rotation of said foil support mounting plates rotates said foil supports around their longitudinal axes for varying the stiffness of said foil elements.

7. The foil journal bearing of claim 6 wherein said housing comprises a cylindrical casing.

* * * * *